United States Patent [19]

Gillan et al.

[11] 4,273,830
[45] Jun. 16, 1981

[54] FIBRILS OF CROSS LINKED POLYESTER RESIN HAVING A VESICULATED STRUCTURE

[75] Inventors: John Gillan, Langwarrin; Colin M. Richards, Black Rock, both of Australia

[73] Assignee: Dulux Australia Limited, Melbourne, Australia

[21] Appl. No.: 68,391

[22] Filed: Aug. 21, 1979

[30] Foreign Application Priority Data

Sep. 12, 1978 [AU] Australia .............................. PD5907

[51] Int. Cl.³ .............................................. D02G 3/00
[52] U.S. Cl. ..................................... 428/398; 428/364; 428/402
[58] Field of Search ............... 428/359, 362, 407, 402, 428/364, 398, 376; 521/62, 182

[56] References Cited

U.S. PATENT DOCUMENTS

| | | | |
|---|---|---|---|
| 3,674,719 | 7/1972 | Jenkins | 521/182 X |
| 3,822,224 | 7/1974 | Gillan et al. | 521/62 |
| 3,891,577 | 6/1975 | Kershaw et al. | 521/62 X |
| 3,923,704 | 12/1975 | Gunning et al. | 521/62 |
| 3,933,579 | 1/1976 | Kershaw et al. | 521/62 X |
| 4,137,380 | 1/1979 | Gunning et al. | 521/62 |

*Primary Examiner*—Lorraine T. Kendell
*Attorney, Agent, or Firm*—Cushman, Darby & Cushman

[57] ABSTRACT

This invention relates to a novel product, fibrils of crosslinked polyester resin having a vesiculated structure, and to a process of making them.

Vesiculated fibrils of crosslinked polyester resin of length 50 μm–5 cm, diameter 1 μm–2 mm and aspect ratio of 10–50 are prepared by pouring into water with stirring a selected solution in unsaturated monomer of a carboxylated unsaturated polyester resin of acid value 10–90 mg KOH per g., the water containing both a base having a $pK_b$ value of 8 maximum and a dispersion stabilizer, and initiating polymerization. The polyester solution is selected for suitability for fibril formation by means of a buoyancy test.

The fibrils are useful in a number of applications, for example, as fillers for paints and putties, viscosity modifiers in liquids and replacements in some applications for fibrous mineral extenders such as asbestos.

2 Claims, No Drawings

FIBRILS OF CROSS LINKED POLYESTER RESIN HAVING A VESICULATED STRUCTURE

This invention relates to novel vesiculated fibrils of carboxylated cross-linked unsaturated polyester resin and to a process of preparing such fibrils.

Unsaturated polyester resins, consisting essentially of co-esterified units of saturated and ethylenically unsaturated dicarboxylic acids and glycols, are known to react with ethylenically unsaturated monomers, for example styrene and methyl methacrylate, to form a cross-linked polymer network.

In the last thirty years numerous commercial applications have been found for these materials as, for example, moulding and potting compounds and surface coatings. It has also been proposed, for example in U.S. Pat. No. 3,822,224, to prepare and use cross-linked unsaturated polyester resins in the form of vesiculated spheroidal granules, as matting and opacifying agents in paints and plastics.

We have now found that one particular group of polyester resins can be used to prepare novel fibrillar particles of cross-linked resin in which the individual fibril has a vesiculated structure. We designate by the term "fibril", fibrous particles which have diameters of the order of 1 $\mu$m to 2 mm and aspect ratios, that is, the ratios of the lengths of the fibrils to their diameters, from about 10-50. Our fibres may be circular or elliptical in cross-section; in the latter case, the "diameter" is considered to be the major axis of the ellipse. The fibril length is typically within the range of 0.5 to 5.0 mm, although by suitable manufacturing techniques this can be extended to about 5 cm.

By a vesiculated structure, we mean that the core of the fibril comprises a plurality of discrete cells or vesicles of liquid or vapour and formed within the body of the fibril. The vesicles vary somewhat in shape, but are usually either spheroidal or elongated, in the manner of a prolate spheroid. An important and distinctive feature is, however, that the internal cells are discrete, isolated entities as distinct from open-ended axial ducts. They are therefore not directly accessible to liquids in which the fibrils might be immersed. The vesicle volume of a typical fibril has been shown by mercury porosimetry to be of the order of 45% of the total fibril volume, although fibrils of appreciably lower vesicle volume may be made.

As mentioned hereinabove, the fibril composition is that of unsaturated polyester resin cross-linked by reaction with ethylenically unsaturated monomer. It is essential that the polyester resin also comprises free carboxyl groups. The preferred concentration of carboxyl groups varies somewhat with the overall composition of the resin, but in general the acid values of useful resins lie within the range of 10-90 mg KOH per gm of resin. In other respects, the composition of potentially useful polyester resins is not critical.

A surprising feature of this invention is our discovery that the carboxylated polyester resins which will yield fibrillar particles in the manner disclosed herein are further distinguished by their performance in the following buoyancy test.

The test is carried out at ambient temperature on a solution of unsaturated polyester resin in ethylenically unsaturated monomer at the ratio of resin to monomer selected to give the desired overall cross-linked resin composition the ratio being such that the proportion of unsaturated polyester resin in the solution is at least 40% by weight. This solution is hereinafter known as "the test solution".

A droplet of test solution is transferred gently from a probe to the surface of water adjusted to a pH of at least 10 with ammonia. The size of the droplet is not critical, a convenient diameter being 2-3 mm. If the test solution is unsatisfactory for fibril manufacture, the droplet will proceed with little if any delay, to drop through the water to the bottom of the container in which it is held. A droplet of test solution suitable for fibril manufacture, will, in direct and obvious contrast, remain suspended on or adjacent to the surface for an appreciable time.

In practice, the behaviour of a test solution may in some instances vary slightly from the behaviour described above, the difference between a test solution which will give fibres and one which will not is readily apparent. A droplet of test solution unsuitable for use in our process will frequently drop straight to the bottom of the water container with very little change in shape. In some cases, it may draw out a short tail behind it as it moves, but on reaching the container bottom, the tail can be seen to shrink back gradually into the bulk of the droplet. When the test solution is satisfactory for use in our process, the droplet may remain entirely suspended on the surface, where it gradually assumes a lens-shaped configuration. More frequently, however, a portion of the suspended droplet gradually sags away from the water surface and assumes a more elongated "teardrop" shape, tail uppermost and in contact with the water surface. In extreme cases, the final shape may be that of a pendent droplet suspended from the water surface by an elongated tail. The tail does not, however, normally contract into the mass of droplet. By comparison with the unsatisfactory test solution, any changes in shape of the satisfactory test solution droplet take place very slowly.

The means available to formulate carboxylated unsaturated polyester resin and the choice of ethylenically unsaturated monomer with which to cross-link them are well publicised and known in the art. Many examples are described in, for example, "Unsaturated Polyesters", Boenig, H. V., Elsevier, New York, U.S.A., 1964.

Thus, suitable saturated acids are, for example; malonic, succinic, glutaric, adipic, pimalic, azaleic, sebacic, dimeric fatty, phthalic, tetrachlorophthalic, tetrahydrophthalic, trimellitic, trimesic and chlorendic acids.

Suitable unsaturated acids are, for example; maleic, fumaric, itaconic, citraconic and mesaconic acids.

The acids may be used in combinations of two or more acids and, where such exists, in the form of the corresponding acid anhydride.

Typical dihydric alcohols may be chosen from, for example; ethylene glycol, diethylene glycol, poly(ethylene glycol)s, hexane-1,6-diol, propylene glycol, dicyclohexanol and neopentyl glycol. Alternatively, the alcohol may be one which initially contained three or more hydroxyl groups, the groups in excess of two optionally being at least in part etherified with, for example, a monohydric alcohol e.g. methanol, ethanol and n-butanol or esterified with a monobasic acid, e.g. benzoic acid, p-tert-butyl benzoic acid and saturated and unsaturated aliphatic acids of up to 18 carbon atoms chain length. Alternatively the dihydric alcohol may be used in the form of an alkylene oxide, e.g. ethylene oxide, propylene oxide and their telomers.

A mixture of such resins may be used, as may a blend of unsaturated polyester resin with a minor proportion of a different resin, for example a saturated polyester resin, provided the test solution formed therefrom meets the conditions of our buoyancy test.

The ethylenically unsaturated monomer which the unsaturated polyester is cross-linked may be selected from, for example; styrene, α-methyl styrene, vinyl toluene, divinyl benzene and esters of acrylic and methacrylic acid, for example methyl(meth)acrylate, ethyl (meth)acrylate, n-butyl(meth)acrylate, acrylonitrile, vinyl acetate, tetraallyl ethoxy ethane, ethylene glycol dimethacrylate and triallyl cyanurate.

In general we have found it preferable to use monomer at least 50% by weight of which is styrene. Polyfunctional monomer, for example, ethylene glycol dimethacrylate, is normally used at weight concentrations of less than about 10% of the total unsaturated monomer, when a polymer with high cross-linking density is required.

We have found that, for the satisfactory commercial formation of vesiculated fibrils, the polyester resin must constitute at least 40% by weight of the polyester solution in monomer.

Our preferred method of making these novel fibrils is to prepare them by a dispersion polymerisation process in water.

The selected polyester is first dissolved in the ethylenically unsaturated monomer required for the cross-linking reaction. If necessary, a few percent by weight of non-reactive solvent for the polyester, for example xylene or n-butanol, may be used to facilitate solution of the polyester in the monomer.

The polyester solution is then poured into water, in the presence of a base, with continuous mechanical stirring. Discrete fibril precursor particles having the general shape and size of the required fibrils are so formed.

The base to be used must be strong one, by which we mean a base which is capable of at least partially ionising the carboxyl groups of the unsaturated polyester resin. In general, such a base will have a dissociation exponent ($pK_b$ value) of less than 8, preferably less than 5. By $pK_b$ value we mean $-\log_{10} K_b$ where $K_b$ is the dissociation constant of the base in water at 25° C. Suitable strong bases are, for example;

inorganic bases, e.g. sodium, potassium, lithium and ammonium hydroxides and their corresponding carbonates;

water-dispersible aliphatic amines, for example primary amines, e.g. methylamine, ethylamine, n-propylamine, isopropylamine, n-butylamine and isobutylamine;

secondary amines, e.g. dimethylamine, diethylamine, di-n-propylamine, di-iso-propylamine, di-n-butylamine and di-iso-propylamine; tertiary amines, e.g. trimethylamine, triethylamine, methyl diethylamine, ethyl dimethylamine, n-tripropylamine and iso-tripropylamine; hydroxy amines, e.g. ethanolamine, diethanolamine and N-methyl ethanolamine;

cyclic amines, e.g. morpholine, pyrrolidine and piperidine; and polyamines, e.g. ethylene diamine, diethylenetriamine, triethylene tetraqine, n-propylene diamine, n-hexylene diamine and menthane diamine.

Mixtures of the above bases may also be used.

The useful concentration of base is about 1-3 equivalent of base per carboxyl group present in the polyester resin. The base may be pre-dissolved in the polyester solution, in the water, or apportioned between both components. The same base need not be present in each component. For example, for ease of incorporation an aliphatic amine, e.g. propanolamine, may be used in the polyester resin solution and ammonia in the water.

In addition to the base hereinabove described, the water must also contain a proportion of colloidal dispersion stabiliser which stabilizes the disperse particles of polyester solutiion in suspension. Such materials are widely used by the art and any of those known to stabilise a dispersion in water of polyester solution may be used. We have found that an especially suitable material is a water-soluble partially hydrolysed poly(vinyl acetate) with a molecular weight of about 100,000 and a degree of hydrolysis of 85-90% but other suitable materials such as poly(vinyl pyrollidone) and poly(ethylene glycol) of molecular weight 6,000 may be used. Such stabilizers are used in concentrations of typically 0.05-1.0% by wt.

At this stage of the process, although the disperse particles have yet to be cured to their final cross-linked structure, their physical shape is essentially fixed. In practice, the aspect ratio (the ratio of overall length to diameter) of the particles rarely exceeds 50, but it is possible to vary the aspect ratio within this limit. Several factors interact to determine the ultimate shape and length of the fibrillated particles; these can be summarised as follows:

(a) an increase in the shear rate applied to the water will shorten the fibrils;

(b) an increase in the viscosity of the aqueous phase will produce shorter, fine fibrils;

(c) an increase in the concentration of base will produce larger fibrils;

(d) an increase in the viscosity of the polyester resin solution, either by increasing the molecular weight of the polyester resin or the polyester content of the solution will produce longer fibres of higher aspect ratio.

We have also found it desirable at times to include in the water a thickener, for example a water-soluble ether of cellulose, especially hydroxy ethyl cellulose, which increases the viscosity of the aqueous component. This increase in viscosity inhibits settling of the fibril precursor particles prior to and during the curing process. As mentioned above, the presence of a thickener in the aqueous component tends to favour the formation of finer and shorter fibrils than would otherwise be yielded by the process. The typical concentration of thickener we have found beneficial is 0.02-1.0% by weight of the water.

It is possible to disperse particulate solids in the resin solution. The solids may be, for example, particles of white or coloured pigment such as titanium dioxide and antimony oxide, which thereby impart a different and sometimes desirable appearance to the fibrils. If, however, the particles have a refractive index close to that of the polyester resin itself, their incorporation therein may not have any observable optical effect on the fibrils at all. Particles of this type are, for example, silica, clay and whiting.

The cross-linking or curing process is carried out by initiating a polymerisation reaction between the unsaturated polyester and polymerisable monomer with a free radical initiator, for example an organic peroxide or a bis-azo nitrile, or by exposure to a radiation source such as radio-active cobalt or ultrav-violet radiation. When an organic source of free radicals is used this is conveniently introduced into the reactants by dissolving it in the monomer or polyester solution before the dispersion is prepared. The curing reaction can be carried out at ambient temperature or it may be accelerated by working at higher temperatures.

The fibrils may be separated from the water in which they are formed by conventional mechanical means, for example by filter or by centrifuge. The cake or mat so-produced is then readily dried by subjecting it to, for example, a warm current of air, to produce a fluffy, fibrous mass of fibrils in a random tangle. The individual fibrils so-prepared have a thread-like shape, usually with a varying degree of random curling. In general, they are roughly circular in cross-section, although we have observed at times that they can exhibit a more ribbon-like structure.

The vesicles of the fibrils prepared as described hereinabove contain water, but this can be substantially removed by the subsequent drying process leaving air-filled vesicles which do not readily imbibe water. Hence, the fibrils have an unusually low bulk density which can be an important economic advantage.

Our novel particles differ in certain other respects from known fibrils of similar size, which are commonly prepared using high energy reactors or by the mechanical reduction of extruded filament, and consisting of thermoplastic polymers, e.g. polyethylene, polypropylene and polyamides.

The fibrils of this invention are tailored directly to the required size and are then cured using low energy initiating systems, to give staple in which the basic polymer is cross-linked, thus conferring on it thermoset properties and resistance to attack by many organic liquids. For this reason they constitute valuable fillers for many applications, for example in paints, putties, gasketting pastes and composites.

Because of the relatively high aspect ratio at which they can be made, the fibrils are very effective viscosity modifiers when incorporated in liquids and pastes, where they can function in much the same manner as fibrous mineral extenders. In fact, for many purposes they are potentially of value as replacements for asbestos and like materials. Their relative insensitivity to heat, deriving from the cross-linked structure of the constituent polymer, is of particular value when the fibrils are incorporated in thermal insulation compositions.

The invention is illustrated by the following examples in which all parts are given by weight:

EXAMPLE 1

Preparation of an unsaturated polyester resin and vesiculated fibrils therefrom.

An unsaturated polyester resin was prepared from the following materials:

| | |
|---|---|
| propylene glycol | 27.11 parts |
| fumaric acid | 20.44 parts |
| phthalic anhydride | 13.04 parts |
| adipic acid | 12.86 parts |
| xylene | 3.70 parts |

The reaction was carried out at 210° C. using the xylene as entraining solvent to strip out water of reaction. The batch was cooled and thinned with 22.81 parts of styrene containing 0.017 parts of hydroquinone, to give a solution of unsaturated polyester resin in ethylenically unsaturated monomer, with the following properties.

| | |
|---|---|
| acid value (calculated on solid resin) | 34.8 mgm KOH per gm |
| Gardner-Holdt viscosity | Y- |
| non-volatile content | 68.7% by wt. |

A drop of the solution when tested by the buoyancy test described hereinabove floated at the surface of the water.

A mixture of 6.29 parts of the above solution and 0.11 parts of ethanolamine was poured slowly, with continuous mechanical stirring, into 17.24 parts of water containing 2.26 parts of 0.880 ammonium hydroxide, 2.3 parts of a 7.5% solution by weight in water of poly(vinyl alcohol) and 2.3 parts of a 1.5% solution by weiight of hydroxyethyl cellulose in water. The grade of poly(vinyl alcohol) used was a partially hydrolysed (approx. 88%) poly(vinyl acetate) which as a 4% by wt. solution in water had a viscosity of 40 cps at 20° C. The hydroxyethyl cellulose was a high viscosity grade, which had a viscosity of 1800 cps at 20° when tested as a 1% by wt. solution in water.

Discrete fibrillar suspended particles of polyester resin solution were formed in the water.

The suspension was diluted with 70 parts of water, and the following materials added slowly and sequentially to it to initiate curing of the particles by a cross-linking reaction between the polyester resin and styrene monomer:

| | |
|---|---|
| cumene hydroperoxide | 0.090 parts |
| diethylene triamine (as a 10% wt soln. in water) | 0.044 parts |
| ferrous sulphate (as a 10% wt soln. in water) | 0.001 parts |

The cured product was a fluffy suspension of fibrils, the individual fibrils having a diameter of the order of 50 μm and length of 1–3 mm. Transverse fractures of the fibrils examined by scanning electron microscope confirmed the presence of a vesiculated structure. The cross-linked nature of the fibrils was shown by their insolubility in warm acetone.

EXAMPLE 2

By the general method of example 1, a series of polyesters was prepared and their solutions in styrene converted to fibrils, with the following results:

| Resin No. | Molar Composition | Acid Value[x] | Viscosity[+] |
|---|---|---|---|
| 1 | P.G/S.A/F.A/P.A 4.05:1:2:1 | 25 | Z |
| 2 | P.G/A$_z$A/F.A/P.A 4.05:1:2:1 | 34 | X |
| 3 | E.G/A.A/F.A/P.A 4.1:1:2:1 | 13 | Z-5 (80%) |
| 4 | D.E.G./A.A/F.A/P.A 4.04:1:2:1 | 69.6 | W+½ |
| 5 | P.G/M.A/P.A 2.7:1:1 | 35 | Z-5 (85%) |
| 6 | P.G/D.F.A/F.A/P.A 4.02:1:2:1 | 33 | Y |

[x]Acid values expressed as mgm KOH per gm of solid resin.
[+] As determined by the Gardner-Holdt method at approx. 70% by wt non-volatile content, except for resins 3 and 4 which were tested and used in fibril manufacture at the indicated non-volatile contents of 80% and 85% respectively.

A.A.      adipic acid

-continued

| Resin No. | Molar Composition | Acid Value$^x$ | Viscosity$^+$ |
|---|---|---|---|
| | AzA | azaleic acid | |
| | D.E.G. | diethylene glycol | |
| | D.F.A. | dimer fatty acids | |
| | E.G. | ethylene glycol | |
| | F.A. | fumaric acid | |
| | M.A. | maleic anhydride | |
| | P.A. | phthalic anhydride | |
| | P.G. | propylene glycol | |
| | S.A. | succinic acid | |

| Resin No. | Buoyancy Test | Product |
|---|---|---|
| 1 | Sinks slowly forming elongated stable tail | Fibrillated approx. 20 μm × 1 mm |
| 2 | Floats at surface | Fibrillated 1–2 mm × 15 mm |
| 3 | As for resin 1 | Fibrillated 5–20 μm × 0.1–1 mm |
| 4 | As for resin 1 | Fibrillated 100–500 μm × 2–5 mm |
| 5 | As for resin 1 | Fibrillated 20 μm × 0.1–0.5 mm |
| 6 | Floats at surface | Fibrillated 50–300 μm × 5–15 mm |

EXAMPLE 3

A further series of polyester resins was prepared and tested for fibril formation by the general method of example 1.

| Resin No. | Molar Composition | Acid Value$^x$ | Viscosity$^+$ |
|---|---|---|---|
| 7 | P.G/F.A/P.A 4.7:3.1:1 | 25 | Y |
| 8 | P.G/A.A/F.A/P.A 4.4:1:2:1 | 20 | R |
| 9 | P.G/F.A/P.A 5.9:3.1:1 | 5.2 | X |

$^x$Acid values expressed as mgm KOH per gm of solid resin.
$^+$As determining by the Gardner-Holdt method. Viscosity testing and attempted fibril production carried out on 70% by wt. solutions of the unsaturated polyester resins in styrene.

| Resin No. | Buoyancy Test | Product |
|---|---|---|
| 7 | sinks | globular, no fibrils |
| 8 | sinks | " |
| 9 | sinks | " |

These resins all failed the buoyancy selection tests and did not produce fibrillar disperse particles.

EXAMPLE 4

Demonstration of the utility of a number of unsaturated monomers.

42.5 parts of an 85% by weight solution of the polyester of Example 1 in styrene was blended with 7.5 parts of methyl methacrylate and the blend poured into an agitated mixture of the following;

| | |
|---|---|
| water | 250 parts |
| 7.5 wt % poly(vinyl alcohol) solution | 15 parts |
| 1.5 wt % hydroxyethyl cellulose solution | 15 parts |
| 30 wt % ammonia solution | 6 parts |

Discrete fibrillar suspended particles of polyester were formed in the water. The following materials were then added slowly and sequentially to the polyester suspension.

| | |
|---|---|
| Cumene hydroperoxide | 1.5 parts |
| diethylene triamine (as a 10% wt soln. in water) | 0.8 parts |
| ferrous sulphate (as a 10% wt soln. in water) | 0.02 parts |

The resulting fibres were 1–3 mm long and 5–20 μm in diameter.

This example was repeated replacing the 7.5 parts of methyl methacrylate with 7.5 parts of each of the following monomers;
 (a) ethyl acrylate
 (b) butyl methacrylate
 (c) "Cellosolve" methacrylate
 (d) 2-ethyl hexyl acrylate
 (e) cyclohexyl methacrylate In each case, fibres of approximately the same dimensions as for the methyl methacrylate example were given.

EXAMPLE 5

Demonstration of the effects of different bases.

Example 1 was repeated ten times using the same materials and methods, but substituting each time for the 2.26 parts of 0.880 ammonium hydroxide, a chemically equivalent amount of one of the following bases;
 (a) sodium hydroxide
 (b) diethylamine
 (c) diethylene triamine
 (d) triethylamine
 (e) ethanolamine
 (f) ethylene diamine
 (g) isopropanolamine
 (h) diethylethanolamine
 (i) magnesium oxide
 (j) calcium oxide Of these bases, (i) and (j) have $pK_b$ values greater than 8. Neither of the examples in which bases (i) and (j) were used gave vesiculated fibres—they gave hard spherical beads of polymer.

EXAMPLE 6

Preparation of fibrils which incorporate particulate solids.

The following ingredients were blended:

| | |
|---|---|
| antimony oxide | 4.2 parts |
| styrene | 6.0 parts |
| polyester (from Example 1) | 50.0 parts |

This blend was then poured into a stirred mixture of the following ingredients;

| | |
|---|---|
| water | 600 parts |
| 0.880 ammonium hydroxide | 12 parts |
| 1.5% hydroxyethyl cellulose solution | 16 parts |
| 7.5% poly(vinyl alcohol) solution | 16 parts |

This gave a suspension consisting mainly of fibrillar particles, but also containing some spherical particles.

The following materials were then added sequentially to the stirred suspension;

| | |
|---|---|
| diethylenetriamine | 0.5 parts |
| cumene hydroperoxide | 1.5 parts |
| ferrous sulphate | 0.012 parts |

The resultant fibrils are approximately 3.5 mm long and 100–200 $\mu$m in diameter. They were also vesiculated, contained antimony oxide and were cross-linked as demonstrated by their insolubility in hot acetone.

EXAMPLE 7

Variation of degree of vesiculation.

170 parts of a 70% solids by weight solution in styrene of the polyester of Example 1 and 1.4 parts of mono-isopropanolamine were mixed and poured with stirring into an aqueous medium comprising the following;

| | |
|---|---|
| water | 1432 parts |
| hydroxyethyl cellulose (1.5% solution in water) | 89.5 parts |
| poly(vinyl alcohol) (7.5% solution in water) | 89.5 parts |
| 30% aqueous ammonia solution | 18 parts |
| The following ingredients were then added in order; | |
| cumene hydroperoxide | 0.25 parts |
| diethylene triamine | 0.11 parts |
| ferrous sulphate | 0.004 parts |

The resultant fibres were 3–5 mm long and 20 $\mu$m in diameter. They were crosslinked as shown by their insolubility in warm acetone and their degree of vesiculation as measured by mercury porosimetry was 18.0%.

This entire procedure was repeated exactly as described above except that the mono-isopropanolamine was omitted. The resultant fibres from this process had the same length and diameter as those mentioned hereinabove but had a degree of vesiculation of 34.0%.

We claim:

1. Fibrils of vesiculated crosslinked polyester resin wherein the diameter is from 1 $\mu$m to 2 mm, the length from 50 $\mu$m–5 cm and the aspect ratio from 10 to 50.

2. Fibrils according to claim 1 characterised in that the polyester resin contains particulate solids.

* * * * *